United States Patent
Mang et al.

(10) Patent No.: US 9,245,075 B2
(45) Date of Patent: Jan. 26, 2016

(54) CONCURRENT OPTIMIZATION OF TIMING, AREA, AND LEAKAGE POWER

(71) Applicant: Synopsys, Inc., Mountain View, CA (US)

(72) Inventors: Yiu-Chung Mang, Toronto (CA); Sanjay Dhar, Lake Oswego, OR (US); Vishal Khandelwal, Portland, OR (US); Kok Kiong Lee, Sunnyvale, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/557,920

(22) Filed: Dec. 2, 2014

(65) Prior Publication Data
US 2015/0089462 A1    Mar. 26, 2015

Related U.S. Application Data

(63) Continuation of application No. 14/068,253, filed on Oct. 31, 2013, now Pat. No. 8,924,901.

(60) Provisional application No. 61/765,587, filed on Feb. 15, 2013.

(51) Int. Cl.
*G06F 17/50* (2006.01)

(52) U.S. Cl.
CPC .......... *G06F 17/505* (2013.01); *G06F 2217/08* (2013.01); *G06F 2217/78* (2013.01); *G06F 2217/84* (2013.01)

(58) Field of Classification Search
CPC ................................. G06F 17/30; G06F 17/50
USPC ....................................................... 716/105
See application file for complete search history.

(56) References Cited

U.S. PATENT DOCUMENTS

| | | | |
|---|---|---|---|
| 5,633,805 A | 5/1997 | Simonsen | |
| 5,914,887 A * | 6/1999 | Scepanovic et al. | 716/123 |
| 6,155,725 A * | 12/2000 | Scepanovic et al. | 716/122 |
| 6,539,477 B1 * | 3/2003 | Seawright | 713/100 |
| 6,732,341 B1 * | 5/2004 | Chang et al. | 716/108 |
| 6,766,499 B1 * | 7/2004 | Mbouombouo et al. | 716/114 |
| 7,729,898 B1 * | 6/2010 | Lytle | 703/26 |
| 8,112,728 B1 * | 2/2012 | Hutton et al. | 716/104 |
| 8,635,580 B2 | 1/2014 | Wang et al. | |
| 2004/0025136 A1 * | 2/2004 | Carelli, Jr. | 716/17 |
| 2011/0231811 A1 * | 9/2011 | Tang et al. | 716/132 |
| 2011/0239179 A1 * | 9/2011 | Shibatani et al. | 716/122 |
| 2013/0318488 A1 * | 11/2013 | Iyer et al. | 716/108 |

OTHER PUBLICATIONS

Rajeev Murgai et al., "Improved Logic Synthesis Algorithms for Table Look Up Architectures," In: 1991 IEEE International Conference on Computer-Aided Design, pp. 564-567, Nov. 11-14, 1991 (http://ieeexplore.ieee.org/xpl/moRtRecentIssue.jsp?punumber=345) See sections 1 and 3-4.

* cited by examiner

*Primary Examiner* — Mohammed Alam
(74) *Attorney, Agent, or Firm* — Park, Vaughan, Fleming & Dowler LLP; Laxman Sahasrabuddhe

(57) ABSTRACT

Systems and techniques are described for performing circuit synthesis. Some embodiments create a lookup table based on information contained in a cell library. The lookup table is then used during circuit synthesis. Specifically, some embodiments optimize cells in a reverse-levelized cell ordering. For a given cell, a table lookup is performed to obtain a set of optimal cell configurations, and the cell is replaced with a cell configuration selected from the set of optimal cell configurations. Some embodiments concurrently optimize cells for timing, area, and power leakage based on the timing criticality of the cells.

12 Claims, 5 Drawing Sheets

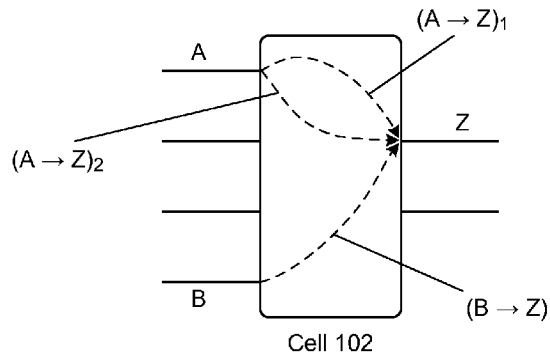
FIG. 1
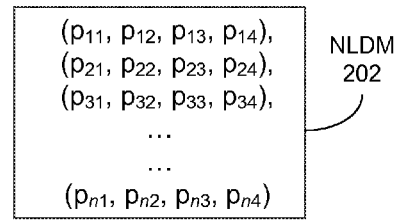
FIG. 2A
FIG. 2B

CONCURRENT OPTIMIZATION OF TIMING, AREA, AND LEAKAGE POWER

RELATED APPLICATION

This application is a continuation of, and claims priority to, U.S. application Ser. No. 14/068,253, entitled "Look-up based fast logic synthesis," by the same inventors, filed on 31 Oct. 2013, the contents of which are herein incorporated by reference in their entirety for all purposes. U.S. application Ser. No. 14/068,253 claims benefit U.S. Provisional Patent Application No. 61/765,587, entitled "Look-up based fast logic synthesis," by the same inventors, filed on 15 Feb. 2013, the contents of which are herein incorporated by reference in their entirety for all purposes.

BACKGROUND

1. Technical Field

This disclosure relates to logic synthesis. More specifically, this disclosure relates to look-up based fast logic synthesis.

2. Related Art

Advances in semiconductor technology presently make it possible to integrate hundreds of millions of transistors onto a single semiconductor chip. This dramatic increase in semiconductor integration densities has made it considerably more challenging to design circuits.

Some circuit synthesis approaches use iterative trial-and-error approach to optimize circuit designs. Specifically, the approach begins with a given circuit design (e.g., a logical or physical design). Next, a cell is identified in the circuit design for optimization based on the metrics that are desired to be optimized. An optimal size for the identified cell is then determined by iteratively replacing the identified cell with functionally equivalent cells that have different sizes (this optimization process is also referred to as "sizing the cell," "sizing the gate," etc.). For each replacement cell size that is tried, the circuit synthesis approach updates timing information, and rejects cell sizes for which one or more timing constraints are violated. The iterative optimization process typically terminates after the optimization process has executed for a certain number of iterations or for a certain amount of time.

Unfortunately, such iterative trial-and-error based circuit synthesis approaches either take too long to complete and/or produce poor quality results for large circuit designs in which timing constraints are checked across many process corners and modes. Therefore, what are needed are systems and techniques for circuit synthesis that do not have the above-mentioned drawbacks.

SUMMARY

Some embodiments disclose systems and techniques for performing circuit synthesis. Specifically, some embodiments create a lookup table, and then use the lookup table during circuit synthesis. The lookup table creation process can begin by receiving a library arc group and an output load. Next, the embodiments can determine a cost metric for a library arc corresponding to the library arc group in each equivalent cell configuration for the selected output load. Specifically, in some embodiments the cost metric for the library arc is combination of two or more terms, wherein the two or more terms include at least an area of the cell configuration and a delay of the cell configuration. The embodiments can then identify one or more cell configurations that have optimal or near optimal cost metrics at the selected output load. Next, the embodiments can associate the output load with the one or more cell configurations in a lookup table for the library arc group.

During optimization, some embodiments can optimize cells in a reverse-levelized cell ordering. Specifically, an optimization engine can receive a cell in a circuit design that is to be optimized (e.g., the cells in the circuit design may be selected in a reverse-levelized cell ordering and provided to the optimization engine). Next, the optimization engine can perform a table lookup based on information associated with the cell to obtain a set of optimal cell configurations. The optimization engine can then replace the cell in the circuit design with a cell configuration selected from the set of optimal cell configurations.

In some embodiments, the lookup table can be a load-based lookup table. In these embodiments, the optimization engine can determine an output load value that is being driven by the cell. Next, the optimization engine can perform the table lookup based on the output load value to obtain the set of optimal cell configurations.

In some embodiments, the lookup table can be a logical-effort-based lookup table. In these embodiments, the optimization engine can perform a table lookup based on a library arc group for the cell to obtain a logical effort value for the cell. Next, the optimization engine can perform a table lookup based on a library arc group for a driver cell that drives an input of the cell to obtain a logical effort value for the driver cell. The optimization engine can then determine an output load value that is being driven by the cell. Next, the optimization engine can compute an optimal input capacitance value for the cell based on the logical effort value for the cell, the logical effort value for the driver cell, and the output load value. The optimization engine can then identify one or more cells in a cell library based on the optimal input capacitance value. Next, the optimization engine can replace the cell in the circuit design with one of the identified cells.

Some embodiments concurrently optimizing timing, area, and power leakage in a circuit design. In these embodiments, an optimization engine can receive a cell for optimization. Next, the optimization engine can determine timing criticality of the cell. The optimization engine can then determine timing criticality of a driver cell that drives an input of the cell. In response to determining that the cell is timing critical, the optimization engine can optimize the cell for timing, but not for area or power leakage. In response to determining that the cell is not timing critical, but the driver cell is timing critical, the optimization engine can optimize the cell for timing and area, but not for power leakage. In response to determining that both the cell and the driver cell are not timing critical, the optimization engine can optimize the cell for area and power leakage, but not for timing.

BRIEF DESCRIPTION OF THE FIGURES

FIG. 1 illustrates a library cell in accordance with some embodiments described herein.

FIG. 2A illustrates how an NLDM can be viewed as a set of points in a four dimensional space in accordance with some embodiments described herein.

FIG. 2B illustrates how an NLDM can be viewed as a two dimensional table in accordance with some embodiments described herein.

DETAILED DESCRIPTION

Figure 3:
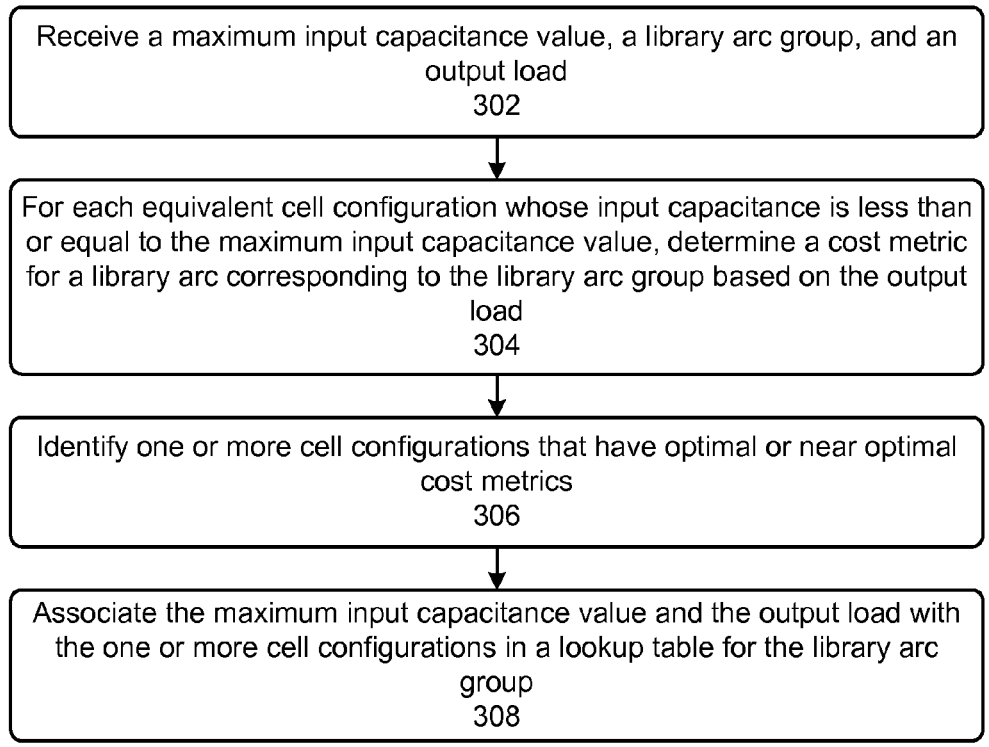
FIG. 3 illustrates a process for creating a load-based lookup table from a cell library in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Overview of Look-Up Based Fast Logic Synthesis

Some embodiments described herein create a data structure (e.g., a lookup table) that associates outputs loads with optimal or near optimal cell configurations. During optimization, an embodiment optimizes the circuit design in reverse-levelized processing order. At each level, the embodiment uses the output load value to select an optimal cell configuration for each cell in the level. Once the embodiment optimizes cells in the last level (i.e., the last level in the reverse-levelized cell ordering), the embodiment can perform another round of optimization. The optimization process can terminate once the embodiment detects that the performance metrics (e.g., timing, area, power, etc.) are not improving (or are improving negligibly) from one optimization round to another.

In the following discussion, we first explain how delays are typically stored in a cell library. Next, we describe embodiments based on two approaches for creating a lookup table. Then, we describe some embodiments for look-up based fast logic synthesis.

Cell Library

A technology library or a cell library is a collection of library cells (which can be combinational or sequential circuit elements) of one or more library cell types. The term "library cell type" or "cell type" refers to the behavior of a cell. For example, an "OR" cell type can refer to cells that perform a logical "OR" operation. The term "library cell" or "cell" refers to a particular implementation of a library cell type. For example, a technology library may include multiple sizes of an inverter. In this example, the term "inverter" is the library cell type, and the term "library cell" refers to an inverter implementation of a particular size.

FIG. 1 illustrates a library cell in accordance with some embodiments described herein. Library cell 102 has a set of inputs and a set of outputs. A signal path within library cell 102 from an input to an output is called a library arc. One or more library arcs may exist between an input and an output of a library cell. For example, two library arcs exist between input A and output Z, which are shown as $(A \rightarrow Z)_1$ and $(A \rightarrow Z)_2$ in the figure. Only one library arc exists between input B and output Z which is shown as $(B \rightarrow Z)$ in the figure. The delay behavior for each library arc can be different. Furthermore, for a given library arc, the delay behavior for a rising output transition can be different from the delay behavior for a falling output transition. In complex library cells like multiplexors, the difference in the delay characteristics for different library arcs and for rising/falling output transitions can be significant. The term "library arc group" is used in this disclosure to refer to equivalent library arcs across different library cells. For example, a library arc group can include the library arcs of multiple "OR" cells in a cell library that all begin at the top input of an "OR" gate and end at the output of the "OR" gate.

The term "non-linear delay model," or "NLDM" for short, is used in this disclosure to refer to a discretized delay model that models cell delay. A discretized delay model is a model in which the delay behavior is represented using a set of discrete data points of delay behavior. Specifically, a discretized delay model, e.g., an NLDM, can be viewed as a set of points in a multi-dimensional space that includes an output loading dimension, an input transition (i.e., slew) dimension, an output delay dimension, and an output transition dimension. In some implementations, multiple NLDMs exist for each library arc of each library cell, e.g., different NLDM models can be used for modeling the delay for a rise-rise, a rise-fall, a fall-rise, or a fall-fall transition.

FIG. 2A illustrates how an NLDM can be viewed as a set of points in a four dimensional space in accordance with some embodiments described herein. NLDM 202 has n points, each represented as a tuple of four elements. The elements in the tuple represent the values in the four dimensions. For example, $p_{11}$ can be a particular output loading value, $p_{12}$ can be a particular input transition value, $p_{13}$ can be a particular output delay value, and $p_{14}$ can be a particular output transition value. This point can represent one data point in the library cell's delay behavior: if the output load on an output "OUT" of a library cell is equal to $p_{11}$ and the library cell receives an input signal on an input "IN" with an input transition $p_{12}$, then the library cell produces an output signal on output "OUT" after a delay $p_{13}$ with an output transition $p_{14}$.

FIG. 2B illustrates how an NLDM can be viewed as a two dimensional table in accordance with some embodiments described herein. NLDM 204 can be represented as a two dimensional table, wherein each element in the table is a tuple of two values. Each row in the table corresponds to a particular output loading value: OL1, OL2, . . . , OLn. Each column in the table corresponds to a particular input transition value: IT1, IT2, . . . , ITm. Each element in the table is a tuple of the output delay value and the output transition value. For example, the tuple (OD32, OT32) is a tuple of the output delay value OD32 and the output transition value OT32 that corresponds to the output loading value OL2 and input transition value IT2.

The two dimensional table shown in FIG. 2B can be used to look up the output delay and output transition value for a given output loading and input transition value. Note that each element in the two dimensional table corresponds to a point in a four dimensional space. For example, the element (OD32, OT32) corresponds to the point (OL3, IT2, OD32, OT32).

Since the NLDM is a discretized delay model, it can be made arbitrarily accurate by increasing the number of points in the model that are used to represent the delay behavior. Many existing technology libraries provide accurate NLDMs for all library arcs of all the library cells.

Load-Based Lookup Table

FIG. 3 illustrates a process for creating a load-based lookup table from a cell library in accordance with some embodiments described herein. The term "lookup table" as used in this disclosure generally refers to any data structure that is capable of storing an association between two or more entities (e.g., two or more columns or data fields), and that allows look ups to be performed based on one or more entities (e.g., one or more columns or data fields). The process can begin by receiving a library arc group, an output load, and optionally a maximum input capacitance value (operation 302). Note that the maximum input capacitance value is optional, i.e., some embodiments do not use the maximum input capacitance value as an input. Next, for each equivalent cell configuration whose input capacitance is less than or equal to the maximum input capacitance value, the process can determine a cost metric for a library arc corresponding to the library arc group based on the output load (operation 304). In embodiments that do not use the maximum input capacitance value, all equivalent cells regardless of their input capacitance values are considered in operation 304.

The term "cell configuration" is used in this disclosure to refer to a circuit that is equivalent to a given cell (i.e., it performs the logical function corresponding to the cell type of the given cell). For example, the cell configuration that includes a "NAND" cell followed by an inverter is equivalent to an "AND" cell. Likewise, an "AND" cell followed by one or more buffers is equivalent to an "AND" cell.

In some embodiments, the cost metric for a library arc is a combination of multiple terms associated with the cell configuration that can include, but are not limited to, area, delay, and power leakage. Specifically, in some embodiments, the cost metric is a weighted sum (or a non-linear combination) of the area of the cell configuration and the delay of the cell configuration for the given output load. In some embodiments, the output loads at which the optimal cell configurations are computed and stored in the lookup table are spaced apart in a geometric series. For example, the output loads can be 0, L, $\alpha L$, $\alpha^2 L$, etc., where L is an output load value, and a is a constant greater than 1. Recall that the delay of a library arc depends on the input transition and the output load. In some embodiments, the input transition value is assumed to be a nominal input transition value, or is assumed to be within a narrow range of input transition values.

Some embodiments can compute the nominal input transition value as follows. To drive a large load, a physical synthesis tool typically inserts a buffer chain in front of the original driver. The total delay of a buffer chain is referred to as the insertion delay of the buffer chain. The library is assumed to contain enough buffers of different sizes so that the buffers are approximately continuously sizable. For a buffer B driving a load L with input transition time t, let transition$_B$(t, L) and delay$_B$(t, L) be the output transition time at the output of the buffer B and the delay through B, respectively (e.g., these values can be obtained from the NLDM for the buffer). The gain g of the buffer is defined as L/C where C is the input capacitance of the buffer B. According to the logical effort theory, to minimize insertion delay, each buffer in the buffer chain should have the same gain g. Such a buffer chain can be modeled as a buffer tree that (1) is rooted at the same leftmost buffer as the buffer chain, (2) has g times as many buffers in the next level as in the current level, and (3) has the same number of levels as the buffer chain.

Thus, the buffer chain insertion problem has been reduced to the following problem: given a load L, the buffer B and the level N is computed for the buffer tree rooted at the buffer B such that the insertion delay of the buffer tree is minimized. For a buffer B with input capacitance C and a gain g, a transition delay t is selected such that both the input and output transition times of B are equal to t (i.e., t=transition$_B$(t, gC)). For a buffer chain driving a load L, the number of levels N of buffers required is N=log(L/C)/log(g) (because each level has gain g, and the total gain is equal to L/C), and the insertion delay is therefore insDelay$_B$(L,g)=N·delay$_B$(t,gC).

Since the delay function of the buffer B is convex in the parameter g, the insertion delay function insDelay$_B$ is also convex in g. Hence, a minimum value for the insertion delay exists. In some embodiments, some or all buffers in the buffer library are iterated through and the buffer B* is chosen so that B* gives the minimum insertion delay, wherein the associated gain of B* is g*. Note that the buffer B* and gain g* are independent of the size of the load L, and as a result, the same buffer and gain can be used for all different loads. The nominal transition delay t* can then be chosen so that t*=transition$_B$*(t*, g*, C*). This nominal transition delay can be used in embodiments described herein.

As mentioned above, some embodiments receive a maximum input capacitance value in operation 302. In operation 304, only those equivalent cell configurations are considered whose input capacitance value is less than (and optionally equal to) the maximum input capacitance value. The maximum input capacitance value can be used to ensure that the input capacitance of the optimal cell configuration is less than a given maximum value.

Once the cost metrics have been computed for the library arc over a set of cell configuration, the process then identifies one or more cell configurations that have optimal or near optimal cost metrics (operation 306). For example, the optimal cost metric can be defined as the minimum cost metric in a set of cost metrics, and cost metrics that are within a range (defined in terms of an absolute value or a percentage) of the optimal cost metric can be considered to be near optimal cost metric values. Next, the process associates the maximum input capacitance value and the output load with the one or more cell configurations in a lookup table for the library arc group (operation 308). Once the lookup table has been created, one or more optimal cell configurations for a given output load value can be quickly determined by performing a table lookup using the output load value (and optionally the maximum input capacitance value).

In embodiments in which a maximum input capacitance value is provided, the process uses two input fields—namely the output load and the maximum input capacitance value—to look up the optimal or near optimal cell configurations. Alternatively, multiple lookup tables can be created, wherein each lookup table corresponds to a particular maximum input capacitance value.

Note that the lookup table represents a delay model of a library arc that models the optimal delay. For example, if linear interpolation is used, then the lookup table represents a piecewise linear delay model of a library arc that models the optimal delay. Suppose the lookup table was created using output load values L1, L2, L3, etc. Then, the delay for the library arc for a given output load value can be computed using linear interpolation (i.e., if the output load value is not equal to the output load values L1, L2, L3, etc.). For example, suppose delays D1, D2, and D3 correspond to output loads L1, L2, and L3. Then for an output load value x, where L1<x<L2, the delay can be computed as $$D1 + \frac{(D2-D1)}{(L2-L1)} \cdot (x-L1).$$

Interpolation techniques other than linear interpolation can also be used. In some embodiments, the lookup table can be used to quickly determine the post-optimization timing for a circuit design. For example, some embodiments can use the lookup table to compute the optimal delay for each cell in the circuit design based on the output load, and then aggregate the optimal delays along circuit paths to compute the expected slack values after circuit optimization.

Logical-Effort-Based Lookup Table

A circuit synthesis approach described in Ivan Sutherland, Robert F. Sproull, and David Harris, Logical Effort: Designing Fast CMOS Circuits, Morgan Kaufmann, 1999, uses the following linear cell delay model:

$$d = h \cdot g + f, \quad (1)$$

where, d is the delay, h is the logical effort, g is the electrical effort or gain, and f represents the intrinsic delay of the cell. The logical effort corresponds to the complexity of the cell (i.e., the more complex the cell, the larger the logical effort value), and is independent of the size of the transistors in the cell. The electrical effort or gain relates to the size of the transistors in the cell. The intrinsic delay can be considered to be a delay overhead.

Equation (1) can be rewritten as:

$$d = R \cdot C_o + f, \quad (2)$$

where, R is the output resistance of the cell, $C_o$ is the output loading, and f is the intrinsic delay of the cell. Equation (2) can then be rewritten as:

$$d = (R \cdot C_i) \cdot \left(\frac{C_o}{C_i}\right) + f, \quad (3)$$

where, $C_i$ is the input capacitance presented by the cell at one of its input terminals. The first term $(R \cdot C_i)$ represents the logical effort h, and the second term $$\left(\frac{C_o}{C_i}\right)$$

represents the gain g. The gain g and the intrinsic delay p can be normalized, e.g., they can be normalized with respect to the gain and intrinsic delay values, respectively, of a reference inverter.

Figure 4:
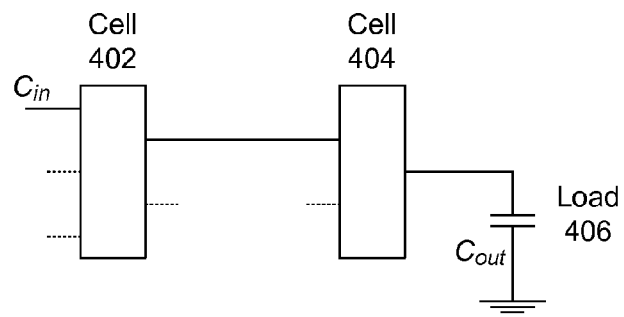
FIG. 4 illustrates how the delay of a two-level path can be computed in a circuit design in accordance with some embodiments described herein.

FIG. 4 illustrates how the delay of a two-level path can be computed in a circuit design in accordance with some embodiments described herein. An output of driver cell 402 is electrically coupled to an input of cell 404, and an output of cell 404 is electrically coupled to load 406. Cells 402 and 404 can have any functionality and can have one or more inputs and one or more outputs (the inputs and outputs of cells 402 and 404 that are not relevant to the two-level delay computation described below are shown with dotted lines). Load 406 can correspond to the effective capacitance of the net that is being driven by the output of cell 404. Let us assume cell 404 is being optimized. Then the two-level delay d is given by the following expression:

$$d = h_a \cdot g_a + f_a + h_b \cdot g_b + f_b, \quad (4)$$

where, $h_a$ and $h_b$ are the logical effort values of cells 402 and 404, respectively, $g_a$ and $g_b$ are the gains of cells 402, and 404, respectively, and $f_a$ and $f_b$ are the intrinsic delays of cells 402, and 404, respectively. Note that $$g_a \cdot g_b = \left(\frac{C_{out}}{C_{in}}\right),$$

where $C_{out}$ is the capacitance of load 406, and $C_{in}$ is the input capacitance of driver cell 402. It can be shown that the two-level delay d is optimal (i.e., minimized) when the delays of the two levels in the two-level path are equal.

In other words, the two-level delay d is optimal when $$h_a \cdot g_a^* = h_b \cdot g_b^* = \sqrt{h_a \cdot g_a \cdot h_b \cdot g_b} = \sqrt{h_a \cdot h_b \cdot \frac{C_{out}}{C_{in}}}, \quad (5)$$

where $g_a^*$ and $g_b^*$ are the optimal gains of cells 402 and 404, respectively.

Rearranging terms, we obtain the following expressions for the optimal gain $g_b^*$ for cell 404 and the optimal input capacitance C* for cell 404:

$$g_b^* = \sqrt{\frac{h_a \cdot C_{out}}{h_b \cdot C_{in}}}, \text{ and} \quad (5)$$

$$C^* = \frac{C_{out}}{g_b^*}. \quad (6)$$

Figure 5:
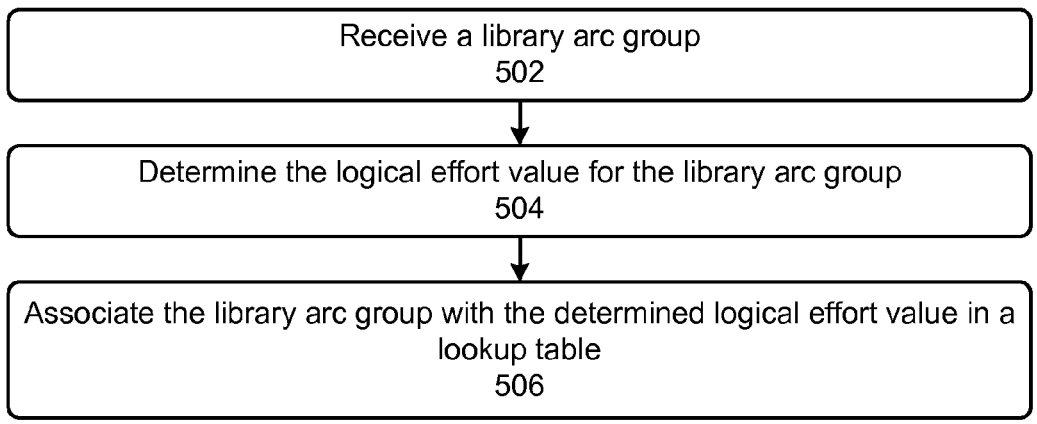
FIG. 5 illustrates a process for creating a logical-effort-based lookup table from a cell library in accordance with some embodiments described herein.

FIG. 5 illustrates a process for creating a logical-effort-based lookup table from a cell library in accordance with some embodiments described herein. The process can begin by receiving a library arc group (operation 502). Next, the process can determine the logical effort value for the library arc group (operation 504). The process can then associate the library arc group with the determined logical effort value in a lookup table (operation 506). During optimization, an embodiment can use the lookup table to determine the optimal cell configuration. For example, while optimizing cell 404 in FIG. 4, the embodiment can look up the logical effort values $h_a$ and $h_b$ for cells 402 and 404, compute the optimal gain $g_b^*$ for cell 404 using Equation (4), and compute the optimal input capacitance C* for cell 404 using Equation (5). The embodiment can then use the optimal input capacitance C* to select an optimal sized cell from the cell library. The process of selecting a discrete cell or a cell configuration based on a lookup value (e.g., an output load value or computed optimal input capacitance value) is called "discretization" and is described in further detail below.

Process for Performing Look-Up Based Fast Logic Synthesis

Figure 6:
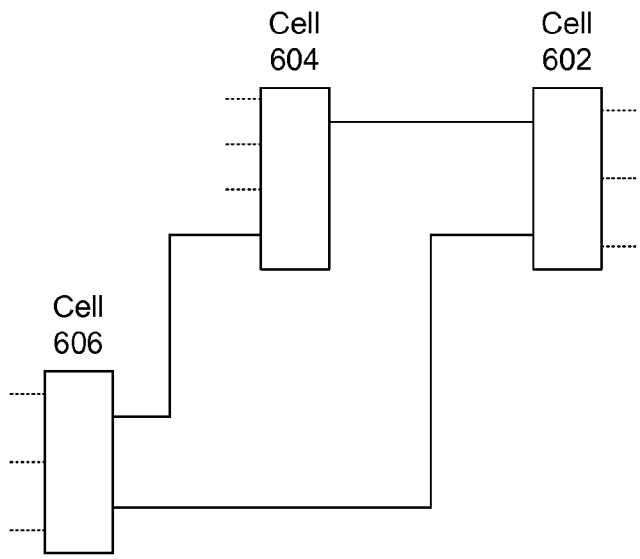
FIG. 6 illustrates a reverse-levelized cell ordering in accordance with some embodiments described herein.

Some embodiments optimize cells in a reverse-levelized cell ordering, which can be determined as follows. The cells whose outputs are the timing endpoints of the circuit can be assigned level "0." All other cells can be assigned a level that is greater than the highest level associated with the cells that are electrically coupled to the cells' outputs. FIG. 6 illustrates a reverse-levelized cell ordering in accordance with some embodiments described herein. Cells 602, 604, and 606 can have any functionality and can have one or more inputs and one or more outputs (the inputs and outputs that are not relevant for illustrating the reverse-levelized cell ordering are shown with dotted lines). Let us assume that cell 602 is assigned level "n." Then cell 604 can be assigned level "n+1", and cell 606 can be assigned level "n+2." The look-up based logic synthesis process can optimize cells in increasing order of the levels. For example, in FIG. 6, a look-up based logic synthesis process can optimize cells in the following order: 602, 604, and 606. Optimizing cells in a reverse-levelized cell ordering reduces the overall amount of timing updates that are required during optimization because the timing information can be updated in a lock step fashion with the optimization (i.e., in a level-by-level order).

Figure 7:
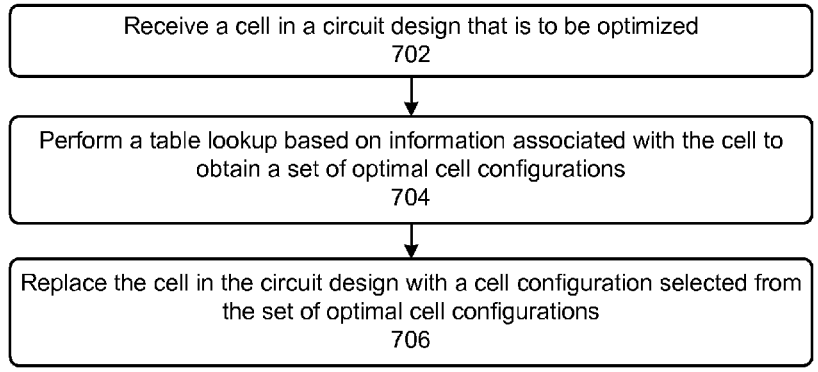
FIG. 7 illustrates a process for performing look-up based fast logic synthesis in accordance with some embodiments described herein.

FIG. 7 illustrates a process for performing look-up based fast logic synthesis in accordance with some embodiments described herein. The process can begin by receiving a cell in a circuit design that is to be optimized (operation 702). Next, the process can perform a table lookup based on information associated with the cell to obtain a set of optimal cell configurations (operation 704). Note that the set of optimal cell configurations can include one or more cell configurations. Specifically, in some embodiments, the process can determine an output load value that is being driven by the cell, and perform the table lookup using the output load value (and optionally the maximum input capacitance value). Note that the lookup table stores optimal and/or near optimal cell configurations for a set of discrete output loads. Therefore, given an output load, some embodiments can discretize the given output load by determining the discrete output load in the lookup table that is closest to the given output load (this corresponds to a "rounding" function). Other embodiments can determine the greatest discrete output load value that is less than the given output load (this corresponds to a "floor" function). Yet other embodiments can determine the smallest discrete output load that is greater than the given output load (this corresponds to a "ceiling" function).

In other embodiments, the process can determine logical effort values for the cell and a driver cell that drives an input of the cell by performing a table lookup based on the library arc of the cell and the driver cell. Next, the process can use the logical effort values and the output load that is being driven by the cell to compute an optimal input capacitance of the cell, and identify one or more optimal or near-optimal cells from the cell library based on the optimal input capacitance. Note that the input capacitances of cells in a cell library are discrete values. Therefore, given an optimal input capacitance value, some embodiments can determine a cell in the library that has the closest input capacitance value (this corresponds to a "rounding" function). Other embodiments can determine a cell that has the greatest input capacitance value that is less than the optimal input capacitance value (this corresponds to a "floor" function). Yet other embodiments can determine a cell that has the smallest input capacitance value that is greater than the optimal input capacitance value (this corresponds to a "ceiling" function).

Next, the process can replace the cell in the circuit design with a cell configuration selected from the set of optimal cell configurations (operation 706). Specifically, in some embodiments, the process can iteratively replace the cell in the circuit design by the cell configurations in the set of optimal cell configurations, and compute one or more metrics (e.g., timing, area, power, etc.) for each cell configuration. Next, the process can select the best cell configuration based on the computed metrics, and replace the cell in the circuit design by the best cell configuration.

In some embodiments, the process can update timing after all of the cells in a given level have been optimized. If the slack at an output of an optimized cell worsens, then the process can roll back the cell optimization. For example, suppose the slack at an output of a cell degrades from +7 to +5 (or, in another example, from +1 to −1, or in yet another example, from −2 to −4), then the process can roll back (i.e., undo) the cell optimization.

In some embodiments, the process can optimize a cell for timing, area, and/or power leakage depending on the timing criticality of the cell and the driver cell. In conventional approaches, the circuit design is typically optimized for only one parameter at a time. For example, the circuit design may be optimized for timing in which one or more cells are replaced by optimal cell configurations to improve one or more timing metrics (e.g., to improve the worst negative slack, the total negative slack, etc.). Then, the circuit design may be optimized for area (this step is often called "area recovery" in conventional design flows). In contrast to such approaches, some embodiments described in this disclosure concurrently optimize timing, area, and power leakage. Specifically, for each cell that is considered during optimization, the embodiments can select different optimization criteria for optimizing the cell (e.g., for one cell, the embodiment may optimize timing, but for the very next cell, the embodiment may optimize area and leakage, but not timing, etc.). Since these embodiments concurrently optimize timing, area, and power leakage, the embodiments can quickly (i.e., when compared to conventional approaches) converge on a circuit design in which all three metrics—timing, area, and power leakage—have been optimized.

Figure 8A:
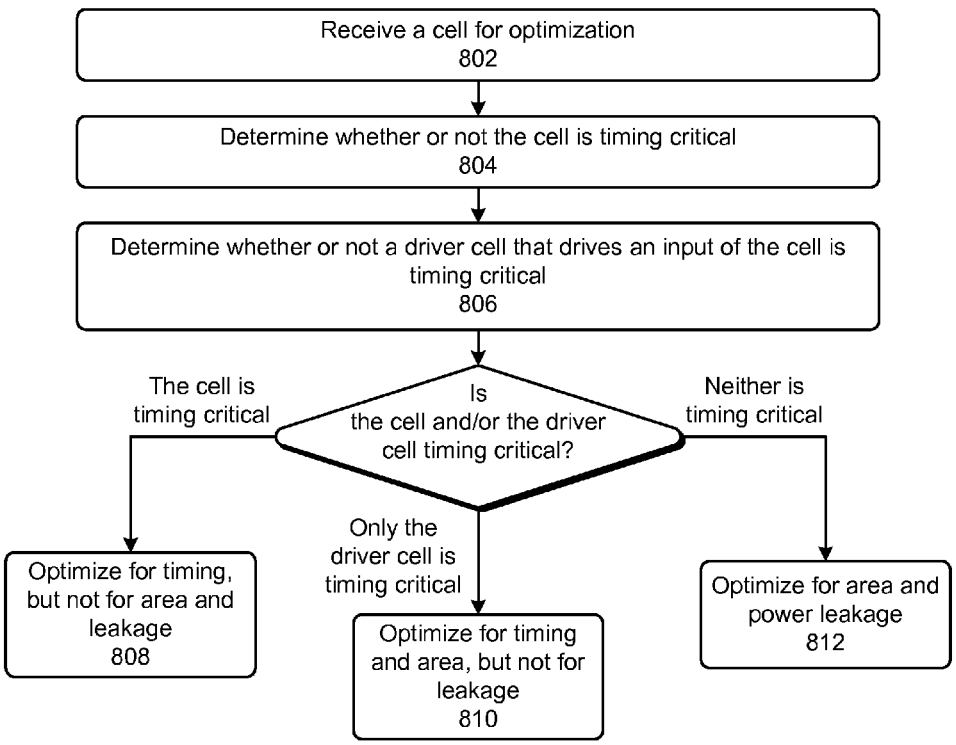
FIG. 8A illustrates a process for concurrently optimizing timing, area, and power leakage in accordance with some embodiments described herein.
Figure 8B:
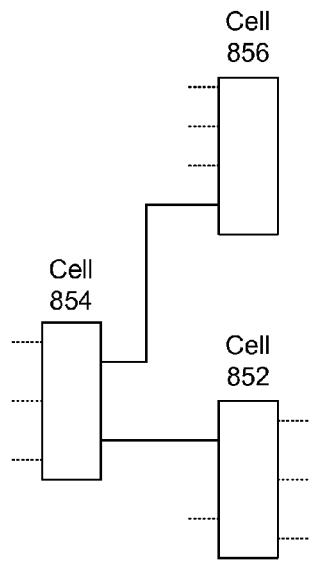
FIG. 8B illustrates a cell in a circuit design that is being optimized in accordance with some embodiments described herein.

FIG. 8A illustrates a process for concurrently optimizing timing, area, and power leakage in accordance with some embodiments described herein. FIG. 8B illustrates a cell in a circuit design that is being optimized in accordance with some embodiments described herein. The process can begin by receiving a cell for optimization (operation 802). Next, the process can determine whether or not the cell is timing critical (operation 804). A cell is timing critical if the cell is close to violating a timing constraint, e.g., if a slack value at a pin of the cell is less than a threshold value (e.g., if the slack is less than +0.2 at a pin of the cell, then the cell can be considered to be timing critical). The process can then determine whether or not a driver cell that drives an input of the cell is timing critical (operation 806). For example, in FIG. 8B, suppose cell 852 is being optimized, and suppose driver cell 854 drives the inputs of cells 852 and 856. Then, the process can determine whether or not cells 852 and 854 are timing critical. Cells 852, 854, and 856 can have any functionality and can have one or more inputs and one or more outputs (the inputs and outputs that are not relevant for illustrating the concurrent optimization process are shown with dotted lines).

Next, the process can determine how to optimize the cell based on the timing criticality of the cell and the driver cell. Specifically, if the cell that is being optimized is timing critical, then the process can optimize the cell for timing (operation 808), e.g., the cell can be optimized to improve timing regardless of the impact the optimization has on other metrics such as area and power leakage. If the cell that is being optimized is not timing critical, but the driver cell is timing critical, then the process can optimize the cell for timing and area, but not power leakage (operation 810), e.g., the cell can be optimized to improve a cost metric that takes both timing and area into account (e.g., a cost metric that combines timing and area improvement/degradation). If both the cell that is being optimized and the driver cell are not timing critical, then the cell can be optimized for area and power leakage, but not for timing (operation 812), e.g., the cell can be optimized to improve a cost metric that takes both area and power leakage into account (e.g., a cost metric that combines area and power leakage improvement/degradation).

Computer System

Figure 9:
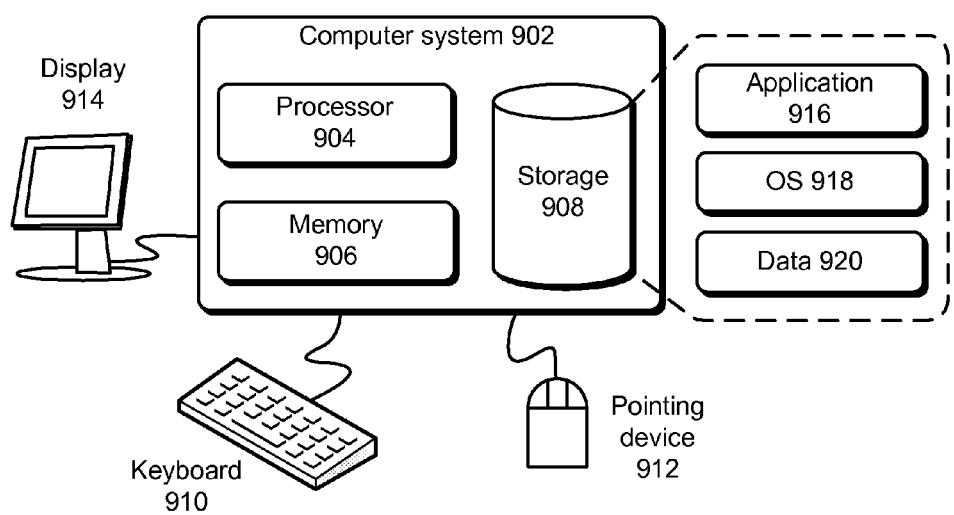
FIG. 9 illustrates a computer system in accordance with some embodiments described herein.

FIG. 9 illustrates a computer system in accordance with some embodiments described herein. A computer or a computer system can generally be any system that can perform computations. Specifically, a computer system can be a microprocessor, an application specific integrated circuit, a distributed computing system, a cloud computing system, or any other computing system now known or later developed. Computer system 902 comprises processor 904, memory 906, and storage 908. Computer system 902 can be coupled with display 914, keyboard 910, and pointing device 912. Storage 908 can generally be any device that can store data. Specifically, a storage device can be a magnetic, an optical, or a magneto-optical storage device, or it can be based on flash memory and/or battery-backed up memory. Storage 908 can store application 916, operating system 918, and data 920.

Application 916 can include instructions that when executed by computer 902 cause computer 902 to perform one or more processes that are implicitly or explicitly described in this disclosure. Data 920 can include any data that is inputted into or outputted by application 916.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In a circuit synthesis system comprising an electronic design automation (EDA) tool in a computer, a method for concurrently optimizing timing, area, and power leakage in a circuit design, the method comprising:
    in response to determining that a cell is not timing critical, but a driver cell that drives an input of the cell is timing critical, the EDA software tool in the computer optimizing the cell based on a first cost metric that combines a first timing metric and a first area metric;
    in response to determining that both the cell and the driver cell are not timing critical, the EDA software tool in the computer optimizing the cell based on a second cost metric that combines a second area metric and a power leakage metric; and in response to determining that the cell is timing critical, the EDA software tool in the computer optimizing the cell based on a second timing metric.

2. The method of claim 1, wherein optimizing the cell based on the second timing metric comprises:

performing a table lookup based on information associated with the cell to obtain a set of optimal cell configurations; and replacing the cell in the circuit design with a cell configuration selected from the set of optimal cell configurations.

3. A non-transitory computer-readable storage medium storing instructions that, when executed by a computer, cause the computer to perform a method for concurrently optimizing timing, area, and power leakage in a circuit design, the method comprising:

in response to determining that a cell is not timing critical, but a driver cell that drives an input of the cell is timing critical, optimizing the cell based on a first cost metric that combines a first timing metric and a first area metric;

in response to determining that both the cell and the driver cell are not timing critical, optimizing the cell based on a second cost metric that combines a second area metric and a power leakage metric; and in response to determining that the cell is timing critical, optimizing the cell based on a second timing metric.

4. The non-transitory computer-readable storage medium of claim 3, wherein optimizing the cell based on the second timing metric comprises:

performing a table lookup based on information associated with the cell to obtain a set of optimal cell configurations; and replacing the cell in the circuit design with a cell configuration selected from the set of optimal cell configurations.

5. A circuit synthesis apparatus for concurrently optimizing timing, area, and power leakage in a circuit design, comprising:

a processor; and a non-transitory computer-readable storage medium storing instructions that, when executed by the processor, cause the circuit synthesis apparatus to perform a method for performing circuit synthesis, the method comprising:

in response to determining that a cell is not timing critical, but a driver cell that drives an input of the cell is timing critical, optimizing the cell based on a first cost metric that combines a first timing metric and a first area metric;

in response to determining that both the cell and the driver cell are not timing critical, optimizing the cell based on a second cost metric that combines a second area metric and a power leakage metric; and in response to determining that the cell is timing critical, optimizing the cell based on a second timing metric.

6. The circuit synthesis apparatus of claim 5, wherein optimizing the cell based on the second timing metric comprises:

performing a table lookup based on information associated with the cell to obtain a set of optimal cell configurations; and replacing the cell in the circuit design with a cell configuration selected from the set of optimal cell configurations.

7. The method of claim 1, wherein at least two different cells in the circuit design are optimized based on two different optimization criteria in a single optimization iteration.

8. The method of claim 7, wherein the circuit design is subsequently provided to a semiconductor manufacturing facility for producing integrated circuit chips.

9. The computer-readable storage medium of claim 3, wherein at least two different cells in the circuit design are optimized based on two different optimization criteria in a single optimization iteration.

10. The computer-readable storage medium of claim 9, wherein the circuit design is subsequently provided to a semiconductor manufacturing facility for producing integrated circuit chips.

11. The circuit synthesis apparatus of claim 5, wherein at least two different cells in the circuit design are optimized based on two different optimization criteria in a single optimization iteration.

12. The circuit synthesis apparatus of claim 11, wherein the circuit design is subsequently provided to a semiconductor manufacturing facility for producing integrated circuit chips.

* * * * *